(12) United States Patent
Marlowe et al.

(10) Patent No.: US 8,441,347 B2
(45) Date of Patent: May 14, 2013

(54) SYSTEM, METHOD AND APPARATUS FOR ENERGIZING VEHICLE BRAKE LIGHTS

(75) Inventors: Kenneth Adam Marlowe, Royse City, TX (US); Bryan Cotanch, Watauga, TX (US); James Parker, Arlington, TX (US)

(73) Assignee: University of North Texas System, Denton, TX (US)

( * ) Notice: Subject to any disclaimer, the term of this patent is extended or adjusted under 35 U.S.C. 154(b) by 372 days.

(21) Appl. No.: 12/860,642

(22) Filed: Aug. 20, 2010

(65) Prior Publication Data

US 2011/0043356 A1    Feb. 24, 2011

Related U.S. Application Data

(60) Provisional application No. 61/235,844, filed on Aug. 21, 2009.

(51) Int. Cl.
*B60Q 1/50*    (2006.01)

(52) U.S. Cl.
USPC ........... 340/467; 340/440; 340/441; 340/479; 340/543; 340/932.2; 701/70; 701/79

(58) Field of Classification Search .................. 340/467, 340/440, 441, 479, 543, 932.2; 701/70, 79
See application file for complete search history.

(56) References Cited

U.S. PATENT DOCUMENTS

| | | | |
|---|---|---|---|
| 7,155,329 B2 * | 12/2006 | Mepham et al. | 701/70 |
| 7,893,823 B2 * | 2/2011 | Morales | 340/479 |
| 2002/0133282 A1 * | 9/2002 | Ryan et al. | 701/70 |
| 2006/0273891 A1 * | 12/2006 | Quach et al. | 340/467 |
| 2009/0261963 A1 * | 10/2009 | Ault | 340/467 |

* cited by examiner

*Primary Examiner* — Tai T Nguyen
(74) *Attorney, Agent, or Firm* — Daniel J. Chalker; Edwin S. Flores; Chalker Flores, LLP

(57) ABSTRACT

The present invention provides system, method and apparatus for energizing one or more brake lights on a vehicle without an operator of the vehicle applying a brake of the vehicle by determining an acceleration of the vehicle, energizing the brake lights on the vehicle whenever the acceleration of the vehicle equals or exceeds a braking threshold, and deenergizing the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

55 Claims, 8 Drawing Sheets

SYSTEM, METHOD AND APPARATUS FOR ENERGIZING VEHICLE BRAKE LIGHTS

CROSS-REFERENCE TO RELATED APPLICATIONS

This application claims priority to U.S. Provisional Application Ser. No. 61/235,844 filed Aug. 21, 2009, the entire contents of which are incorporated herein by reference.

FIELD OF THE INVENTION

The present invention relates generally to the field of transportation and, more particularly, to a system, method and apparatus for energizing vehicle brake lights.

BACKGROUND OF THE INVENTION

According to United States Department of Transportation statistical data, vehicular accidents are constantly on the rise. This is partly because more vehicles than ever are on the roadways, but also because the opportunity for distraction on the road is much higher. The people of the United States have embraced the technological revolution, and all of the gadgets and gizmos that follow suit. Talking on cell phones, sending text messages, reading the daily news, browsing emails, or any other number of activities, are common observations seen on the roadway today. The primary task of attentively driving has become a secondary task.

As a result, there is a need for a system, method apparatus for energizing brake lights that provides an early warning signal to other drivers that the target vehicle's momentum is actually reducing because not everyone on the roadway has excellent vision and depth perception.

SUMMARY OF THE INVENTION

The present invention is a microcontroller-based safety device for motorcycles and other types of vehicles that provides an early warning signal to other drivers that the target vehicle's momentum is actually reducing because not everyone on the roadway has excellent vision and depth perception. An accelerometer chip, which measures acceleration, is used to control a brake light using the automobile's momentum, instead of a driver's foot on the brake pedal. Since the present invention removes human error from part of the equation, the number of rear-end or rear-angle accidents, or the severity of the accidents that do occur, can be reduced. Briefly stated, the present invention converts an analog voltage output from an accelerometer to a digital value that is interpreted by a microcontroller program to designate whether a certain threshold voltage is exceeded, thereby powering the brake light system when a motor vehicle slows down (e.g., down-shifted, coasting, etc). As a result, a visual representation of unsafe deceleration of the target vehicle is provided to other drivers on the roadway.

For example, one embodiment of the present invention provides a method for energizing one or more brake lights on a vehicle without an operator of the vehicle applying a brake of the vehicle by determining an acceleration of the vehicle, energizing the brake lights on the vehicle whenever the acceleration of the vehicle equals or exceeds a braking threshold, and deenergizing the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

Another embodiment of the present invention provides a method for energizing one or more brake lights on a vehicle without an operator of the vehicle applying a brake of the vehicle by determining an acceleration and an acceleration rate of the vehicle, activating an air bag whenever the acceleration rate equals or exceeds a collision threshold, providing a skid warning to the operator whenever the acceleration rate equals or exceeds a skid threshold, energizing the brake lights on the vehicle whenever the acceleration of the vehicle equals or exceeds a braking threshold, and deenergizing the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

The present invention also provides an apparatus for energizing one or more brake lights on a vehicle without an operator of the vehicle applying a brake of the vehicle that includes an accelerometer that measures an acceleration of the vehicle and a processor communicably coupled to the accelerometer. The processor: (1) energizes the brake lights on the vehicle whenever the measured acceleration of the vehicle equals or exceeds a braking threshold, and (2) deenergizes the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

In addition, the present invention provides a kit for retrofitting a vehicle to energize one or more brake lights on the vehicle without an operator of the vehicle applying a brake of the vehicle that includes an enclosure suitable for installation within the vehicle, an accelerometer disposed within the enclosure that measures an acceleration of the vehicle, a switch disposed within the enclosure, and a processor disposed within the enclosure that is communicably coupled to the accelerometer and the switch. The processor: (1) energizes the brake lights on the vehicle using the switch whenever the measured acceleration of the vehicle equals or exceeds a braking threshold, and (2) deenergizes the brake lights on the vehicle using the switch whenever: (a) the brake lights are energized, (b) the acceleration of the vehicle is less than the braking threshold, (c) a specified period of time has elapsed since the brake lights were energized, and (d) the operator is not applying the brake of the vehicle. The kit also includes a set of terminals on the exterior of the enclosure that are connected to the voltage regulator and the switch, and a set of wires to connect the set of terminals to a power supply of the vehicle, the brake lights of the vehicle, and a ground plane of the vehicle.

Moreover, the present invention provides a system for energizing one or more brake lights on a vehicle without an operator of the vehicle applying a brake of the vehicle that includes the vehicle having a power supply and the brake lights, an accelerometer disposed within the vehicle that measures an acceleration of the vehicle, and a processor disposed within the vehicle and communicably coupled to the accelerometer. The processor: (1) energizes the brake lights on the vehicle whenever the measured acceleration of the vehicle equals or exceeds a braking threshold, and (2) deenergizes the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to cars and motorcycles, but it will be understood that the concepts of the present invention are applicable to any type of vehicle that has brake lights.

The present invention is a microcontroller-based safety device for motorcycles and other types of vehicles that provides an early warning signal to other drivers that the target vehicle's momentum is actually reducing because not everyone on the roadway has excellent vision and depth perception. An accelerometer chip, which measures acceleration, is used to control a brake light using the automobile's momentum, instead of a driver's foot on the brake pedal. Since the present invention removes human error from part of the equation, the number of rear-end or rear-angle accidents, or the severity of the accidents that do occur, can be reduced. Briefly stated, the present invention converts an analog voltage output from an accelerometer to a digital value that is interpreted by a microcontroller program to designate whether a certain threshold voltage is exceeded, thereby powering the brake light system when a motor vehicle slows down (e.g., down-shifted, coasting, etc). As a result, a visual representation of unsafe deceleration of the target vehicle is provided to other drivers on the roadway.

Figure 1:
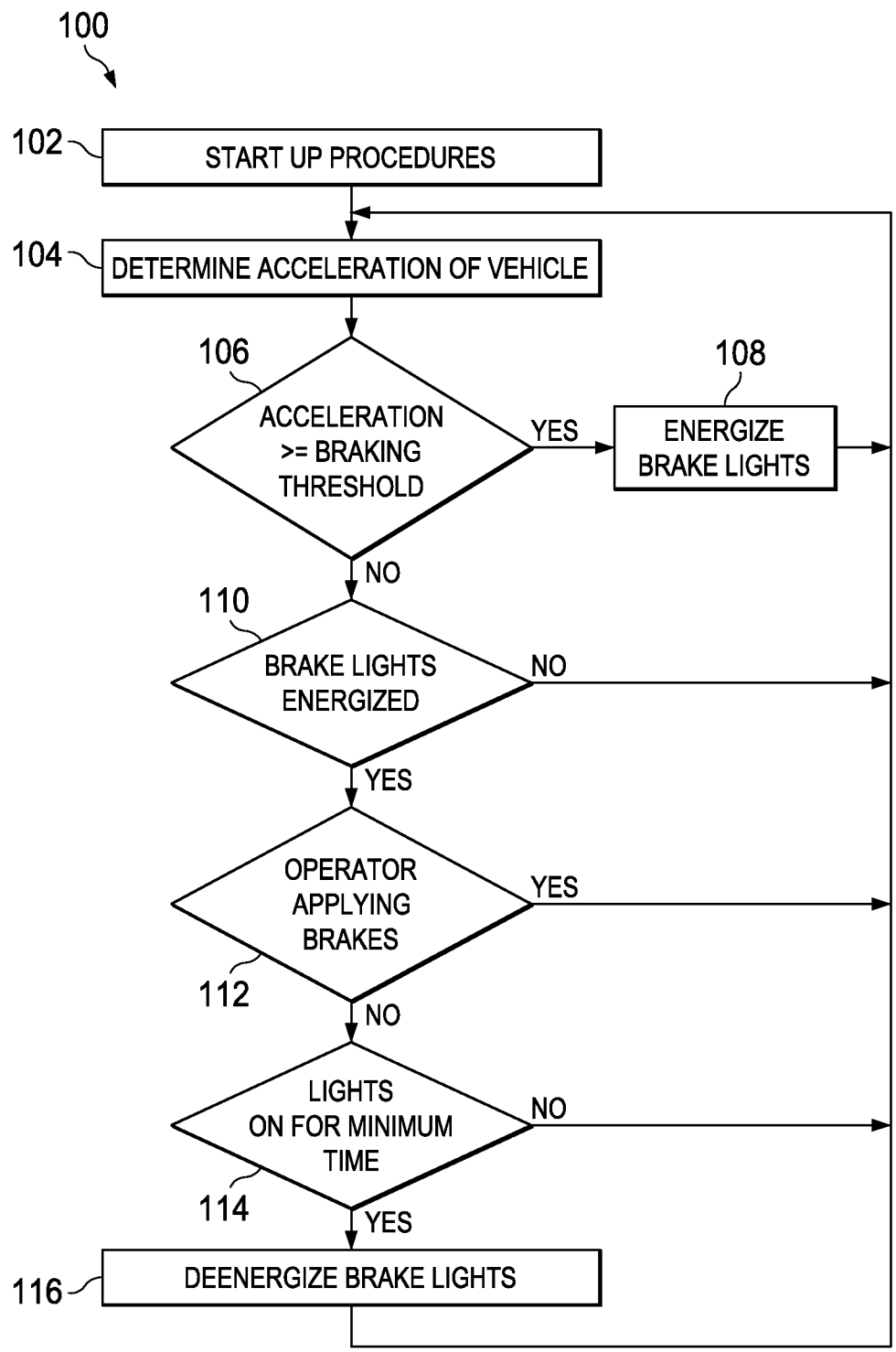
FIG. 1 is a flow chart illustrating a method for energizing brake lights on a vehicle in accordance with one embodiment of the present invention.

Now referring to FIG. 1, a flow chart illustrating a method 100 for energizing brake lights on a vehicle without an operator of the vehicle applying a brake of the vehicle in accordance with one embodiment of the present invention is shown. The vehicle can be car, a truck, a van, a trailer, a motorcycle, a recreational vehicle, a motorized cart, an industrial or construction vehicle, a motorized equipment, a combination thereof, or any other type of moving object having brake lights. One or more start up procedures (e.g., initialization of variables, data integrity checks, hardware diagnostics, etc.) are executed or performed in block 102. Once the start up is successful or upon the occurrence of a trigger event (e.g., shifting the vehicle out of park (automatic transmission), releasing the parking brake (manual transmission), etc.), an acceleration of the vehicle is determined in block 104. The acceleration can be determined by an accelerometer. If the acceleration of the vehicle equals or exceeds a braking threshold; as determined in decision block 106, the brake lights on the vehicle are energized in block 108 and the process loops back to block 104 to continue monitoring the acceleration of the vehicle. If, however, the acceleration of the vehicle is less than the braking threshold, as determined in decision block 106, the brake lights are already energized, as determined in decision block 110, the operator is not applying the brakes, as determined in decision block 112, and the brake lights have been on for a minimum amount of time, as determined in decision block 114, the brake lights on the vehicle are deenergized in block 116. The process the loops back to block 104 to continue monitoring the acceleration of the vehicle. If the brake lights are not energized, as determined in decision block 110, or the operator is applying the brakes, as determined in decision block 112, or the brake lights have not been on for a minimum amount of time, as determined in decision block 114, process the loops back to block 104 to continue monitoring the acceleration of the vehicle.

Additional functionality can be added to the method described above, for example: (i) the brake lights are not energized when the vehicle is in reverse unless the operator applies the brakes; (ii) an acceleration rate of the vehicle is determined; (iii) the acceleration and a status of the brake lights can be logged or recorded; (iv) the acceleration and the status of the brake lights can be provided to one or more vehicle systems, one or more vehicles within a specified range, a remote data processing system, or a combination thereof; (v) one or more cylinders in the vehicle can be engaged or disengaged based on the acceleration; and/or (vi) the logged data can be provided to an onboard diagnostics port, etc. Logging the data or providing the data to other systems could include storing the information in a "black box" or a diagnostics memory. The information can be uploaded to an off-vehicle monitoring system, such as Onstar®, provided to other operating systems in the vehicle, or sent to adjacent vehicles to provide warnings or initiate evasive systems. Whenever the acceleration rate of the vehicle is measured: (i) an air bag can be activated whenever the acceleration rate equals or exceeds a collision threshold; (ii) a skid warning can be provided to the operator whenever the acceleration rate equals or exceeds a skid threshold; and/or (iii) a traction control of the vehicle can be activated whenever the acceleration rate equals or exceed a skid threshold. The rate of acceleration can be determined by an inertia sensor or a G-force sensor. Note that the method described above can be performed by a computer program embodied on a computer readable medium wherein each step is executed by one or more code segments using a processor, computer or other suitable controller.

Figure 2:
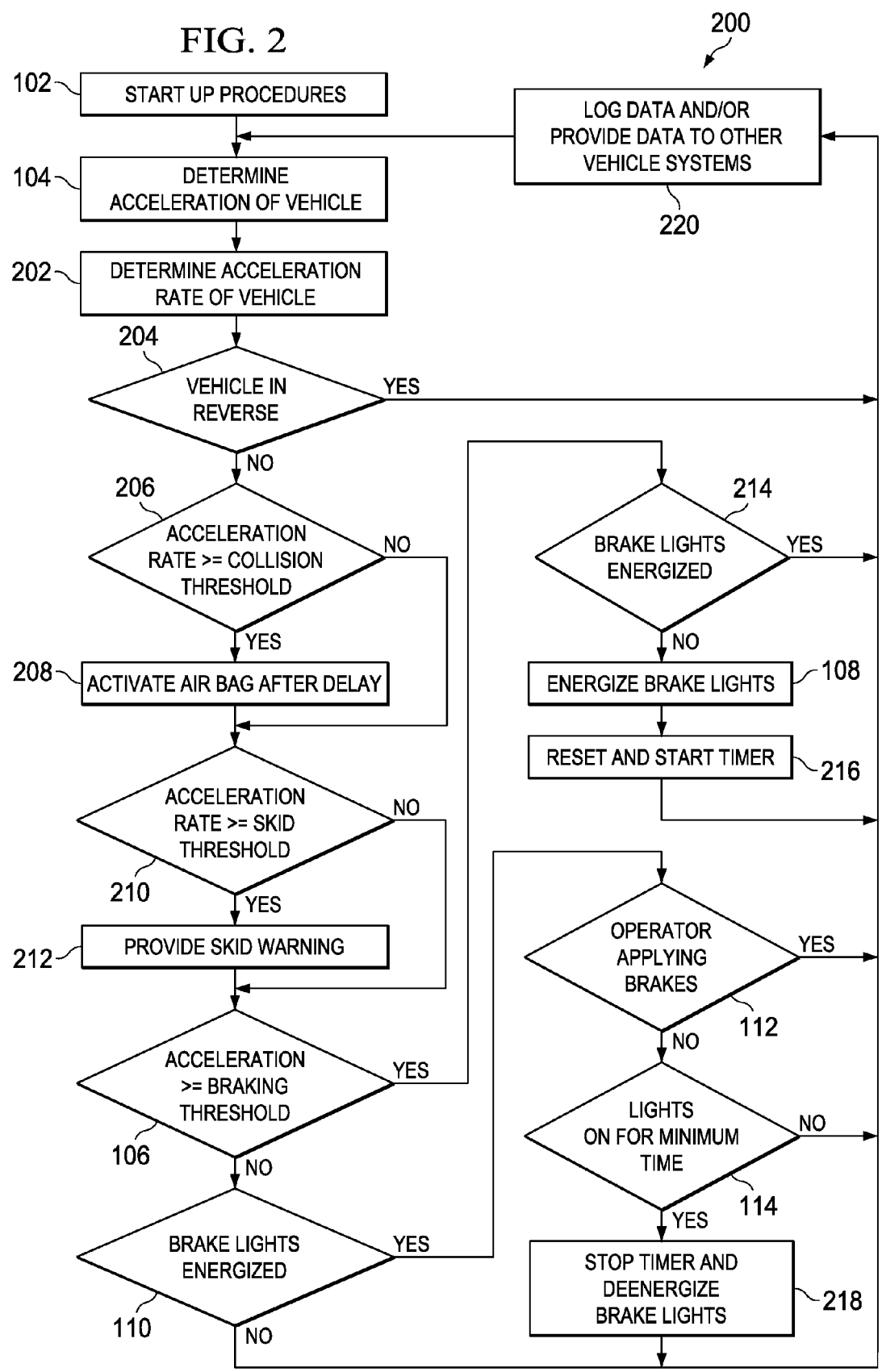
FIG. 2 is a flow chart illustrating a method for energizing brake lights on a vehicle in accordance with another embodiment of the present invention.

Referring now to FIG. 2, a flow chart illustrating a method 200 for energizing brake lights on a vehicle in accordance with another embodiment of the present invention is shown. The vehicle can be car, a truck, a van, a trailer, a motorcycle, a recreational vehicle, a motorized cart, an industrial or construction vehicle, a motorized equipment, a combination thereof, or any other type of moving object having brake lights. One or more start up procedures (e.g., initialization of variables, data integrity checks, hardware diagnostics, etc.) are executed or performed in block 102. Once the start up is successful or upon the occurrence of a trigger event (e.g., shifting the vehicle out of park (automatic transmission), releasing the parking brake (manual transmission), etc.), an acceleration of the vehicle is determined in block 104 and an acceleration rate of the vehicle is determined in decision block 202. The acceleration can be determined by an accelerometer and the rate of acceleration can be determined by an inertia sensor or a G-force sensor. If the vehicle is in reverse, as determined in decision block 204, the data is logged and/or provided to other vehicle systems in block 220. Logging the data or providing the data to other systems could include storing the information in a "black box" or a diagnostics memory. Note that the acceleration and the status of the brake lights can also be provided to one or more vehicles within a specified range, a remote data processing system, or a combination thereof. For example, the information can be uploaded to an off-vehicle monitoring system, such as Onstar®, provided to other operating systems in the vehicle, or sent to adjacent vehicles to provide warnings or initiate evasive systems. Thereafter, the process returns to blocks 104 and 202 to continue monitoring the acceleration and acceleration rate of the vehicle.

If, however, the vehicle is not in reverse, as determined in decision block 204, and the acceleration rate of the vehicle is greater than or equal to a collision threshold, as determined in decision block 206, one or more airbags are activated after a specified delay in block 208. Thereafter or if the acceleration rate of the vehicle is less than the collision threshold, as determined in decision block 206, and the acceleration rate of the vehicle is greater than or equal to a skid threshold, as determined in decision block 210, a skid warning is provided in block 212. The skid warning may also activate a traction control of the vehicle. Thereafter or if the acceleration rate is less than the skid threshold, as determined in decision block 210, and the acceleration of the vehicle is less than a braking threshold, as determined in decision block 106, and the brake lights are not energized, as determined in decision block 110, the process loops back to block 220 where the data is logged or provided to other systems and the process continues as previously described.

If, however, the acceleration of the vehicle is greater than or equal to the braking threshold, as determined in decision block 106, and the brake lights have already been energized, as determined in decision block 214, the process loops back to block 220 where the data is logged or provided to other systems and the process continues as previously described. If, however, the brake lights have not already been energized, as determined in decision block 214, the brake lights on the vehicle are energized in block 108, a timer is reset and started in block 216, and the process loops back to block 220 where the data is logged or provided to other systems and the process continues as previously described.

If, however, the brake lights are not energized, as determined in decision block 110, and the operator is not applying the brakes, as determined in decision block 112, the process loops back to block 220 where the data is logged or provided to other systems and the process continues as previously described. If, however, the operator is not applying the brakes, as determined in decision block 112, and the brake lights have not been on for a minimum amount of time as measured by the timer, as determined in decision block 114, the process loops back to block 220 where the data is logged or provided to other systems and the process continues as previously described. If, however, the brake lights have been on for a minimum time period as measured by the timer, as determined in decision bock 114, the timer is stopped and the brake lights are deenergized in block 218, and the process loops back to block 220 where the data is logged or provided to other systems and the process continues as previously described.

Additional functionality can be added to the method described above. For example: one or more cylinders in the vehicle can be engaged or disengaged based on the acceleration; and/or the logged data can be provided to an onboard diagnostics port, etc. Note that the method described above can be performed by a computer program embodied on a computer readable medium wherein each step is executed by one or more code segments using a processor, computer or other suitable controller.

Figure 3:
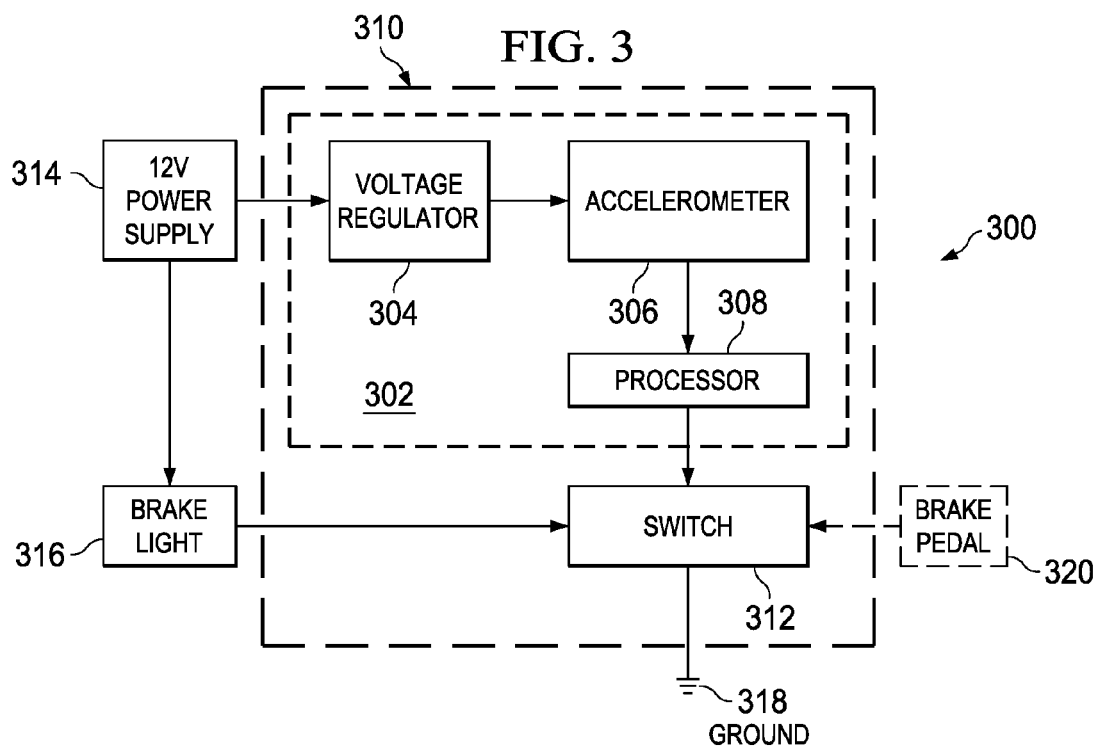
FIG. 3 is a block diagram of an apparatus and system for energizing brake lights on a vehicle in accordance with one embodiment of the present invention.

Now referring to FIG. 3, a block diagram of an apparatus (302 or 310) and system (300) for energizing brake lights 316 on a vehicle in accordance with one embodiment of the present invention is shown. The present invention can be provided as an integrated device (apparatus 302) in a new vehicle, or a kit (apparatus 302) for installation in an existing vehicle. The integrated device (apparatus 302) includes a voltage regulator 304, an accelerometer 306 connected to the voltage regulator 304, and a processor 308 communicably coupled to the accelerometer 306. Note that the term communicably coupled can mean integrated with, directly connected, connected via one or more other components, or wirelessly connected via one or more communications devices or communications protocols (if applicable). The kit (apparatus 310) includes the voltage regulator 304, the accelerometer 306 connected to the voltage regulator 304, the processor 308 communicably coupled to the accelerometer 306 and a switch 312 communicably coupled to the processor 308. Note that other components can be added as will be appreciated by those skilled in the art. Moreover, the connectivity of the components can be changed as long as the functionality is preserved.

When provided as a kit (apparatus 302), the voltage regulator 304, accelerometer 306, processor 308 and switch 312 are disposed within an enclosure suitable for installation within the vehicle. A set of terminals are provided on the exterior of the enclosure that are used to connect to the voltage regulator 304 to the external power supply or power plane 314, and the switch 312 to the brake light 316 and ground plane 318. Terminals for other connections can also be provided. A set of wires is provided to connect the set of terminals to the vehicle power supply or power plane 314, the brake lights 316 of the vehicle to the switch 312, and the ground plane 318 of the vehicle to the switch 312. The enclosure, terminals and wires can also be used in the integrated device (apparatus 310).

The accelerometer 306, such as a Dimension Engineering DE-ACCM3D accelerometer chip or other suitable device measures an acceleration of the vehicle. The voltage regulator 304, such as a Fairchild LM7805 Voltage Regulator or other suitable device, is connected to the vehicle's power supply 314 (e.g., battery or power plane). Although a 12 volt power supply is shown, the power supply 314 can be any suitable voltage provided within the vehicle. The power supply 314 is also connected to the brake light 316. The switch 312, such as a Fairchild RFD16N05L Logic Level, n-channel Power MOSFET, is connected between the brake light 316 and the ground plane 318. The vehicle brake pedal 320 can also be used to control the switch 312.

The processor 308, such as an Atmel ATMEGA48 microcontroller: (1) energizes the brake lights 316 on the vehicle using the switch 312 whenever the measured acceleration of the vehicle equals or exceeds a braking threshold, and (2) deenergizes the brake lights 316 on the vehicle using the switch 312 whenever: (a) the brake lights 316 are energized, (b) the acceleration of the vehicle is less than the braking threshold, (c) a specified period of time has elapsed since the brake lights 316 were energized, and (d) the operator is not applying the brake of the vehicle. The processor 308 can perform other functionality as described herein. Moreover, the processor 308 can integrated into a more sophisticated computer, processor or control system within the vehicle.

Figure 4:
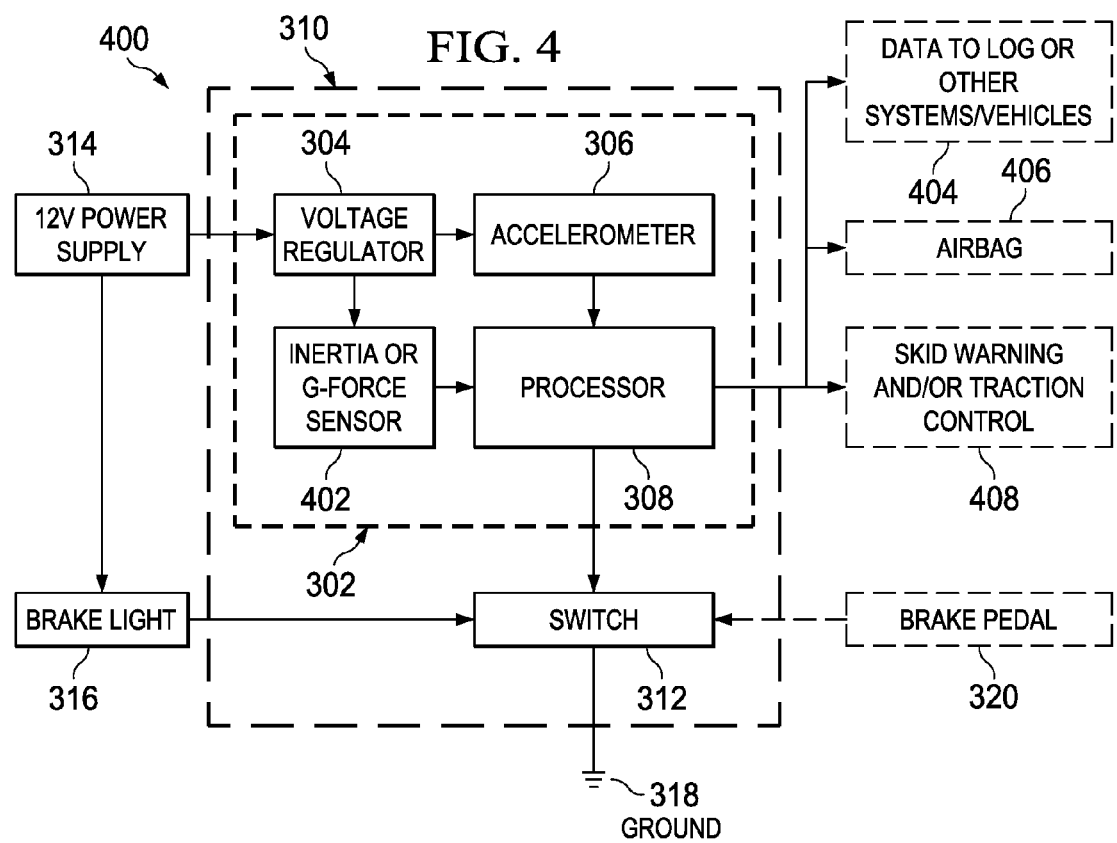
FIG. 4 is a block diagram of an apparatus and system for energizing brake lights on a vehicle in accordance with another embodiment of the present invention.

Now referring to FIG. 4, a block diagram of an apparatus (302 or 310) and system (400) for energizing brake lights 316 on a vehicle in accordance with another embodiment of the present invention is shown. The present invention can be provided as an integrated device (apparatus 302) in a new vehicle, or a kit (apparatus 302) for installation in an existing vehicle. The integrated device (apparatus 302) includes a voltage regulator 304, an accelerometer 306 connected to the voltage regulator 304, an inertia or g-force sensor 402 connected to the voltage regulator 304, and a processor 308 communicably coupled to the accelerometer 306 and the inertia or g-force sensor 402. Note that the term communicably coupled can mean integrated with, directly connected, connected via one or more other components, or wirelessly connected via one or more communications devices or communications protocols (if applicable). The kit (apparatus 310) includes the voltage regulator 304, the accelerometer 306 connected to the voltage regulator 304, the inertia or g-force sensor 402 connected to the voltage regulator 304, the processor 308 communicably coupled to the accelerometer 306 and the inertia or g-force sensor 402, and a switch 312 communicably coupled to the processor 308. Note that other components can be added as will be appreciated by those skilled in the art. Moreover, the connectivity of the components can be changed as long as the functionality is preserved.

When provided as a kit (apparatus 302), the voltage regulator 304, accelerometer 306, inertia or g-force sensor 402, processor 308 and switch 312 are disposed within an enclosure suitable for installation within the vehicle. A set of terminals are provided on the exterior of the enclosure that are used to connect to the voltage regulator 304 to the external power supply or power plane 314, and the switch 312 to the brake light 316 and ground plane 318. Terminals for other connections can also be provided, such as to provide data to log or other systems/vehicles 404, airbags 406, skid warning and/or traction control 408, etc. A set of wires is provided to connect the set of terminals to the vehicle power supply or power plane 314, the brake lights 316 of the vehicle to the switch 312, the ground plane 318 of the vehicle to the switch 312, and the other processor 308 terminals. The enclosure, terminals and wires can also be used in the integrated device (apparatus 310).

The accelerometer 306 measures an acceleration of the vehicle and the inertia or g-force sensor 402 measures the rate of acceleration of the vehicle. The voltage regulator 304 is connected to the vehicle's power supply 314 (e.g., battery or power plane). Although a 12 volt power supply is shown, the power supply 314 can be any suitable voltage provided within the vehicle. The power supply 314 is also connected to the brake light 316. The switch 312 is connected between the brake light 316 and the ground plane 318. Additional switches can be used by the processor 308 to control other functions, such as airbag deployment 406, skid warnings and/or traction control 408, etc. The vehicle brake pedal 320 can also be used to control the switch 312.

The processor 308: (1) activates an air bag 406 whenever the acceleration rate equals or exceeds a collision threshold; (2) provides a skid warning to the operator and/or activates traction control 408 whenever the acceleration rate equals or exceeds a skid threshold; (3) energizes the brake lights 316 on the vehicle using the switch 312 whenever the measured acceleration of the vehicle equals or exceeds a braking threshold, and (4) deenergizes the brake lights 316 on the vehicle using the switch 312 whenever: (a) the brake lights 316 are energized, (b) the acceleration of the vehicle is less than the braking threshold, (c) a specified period of time has elapsed since the brake lights 316 were energized, and (d) the operator is not applying the brake of the vehicle. The processor 308 can perform other functionality as described herein. Moreover, the processor 308 can integrated into a more sophisticated computer, processor or control system within the vehicle.

A prototype of the present invention has been designed, built and tested as will be further described in reference to FIGS. 5-12 below.

Figure 5:
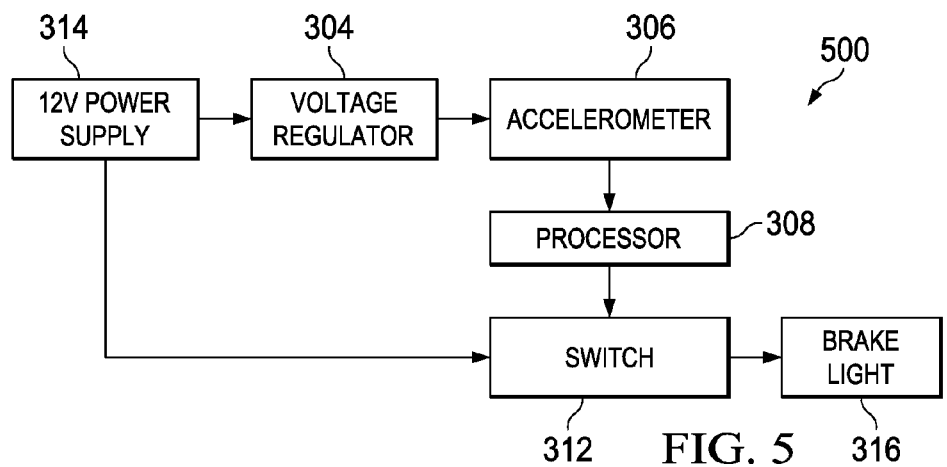
FIG. 5 is a block diagram of a prototype used to test the present invention.

Referring now to FIG. 5, a simplified block diagram of the prototype 500 used to test the present invention is shown. To build the actual prototype, a 12V/20 A accessory power supply 314 that is built into most modern automobiles was used. For permanent installation in a vehicle, the vehicle's battery would act as the circuit's power supply. Changing the power supply would require no alteration to the design of the circuit.

Once 12V enters the circuit, it is divided into two legs. One leg runs directly to the positive lead on the LED brake light 316, which uses a logic level MOSFET 312 to control distribution of the 12V to the LED 316. The logic level MOSFET 312 is explained in detail later. The other leg of the 12V is supplied to an LM7805 Voltage Regulator 304 which produces a steady 5V stream that directly powers the accelerometer chip 306. The Dimension Engineering DE-ACCM3D accelerometer chip 306 provides a voltage regulator pin that produces a steady 3.3V output. This 3.3V is used to power a low-power ATMEGA48 microcontroller 308. The 3.3V is also used in the Analog-to-Digital Conversion calculations.

Once the analog voltage is converted to a digital value within the microcontroller 308, the last step is to produce a response at the brake light 316. Through the design of the microcontroller code and the use of a RFD16N05L Logic Level, n-channel Power MOSFET 312, the circuit produces the proper response at the brake light 316. The logic level MOSFET 312 receives a logic level one that opens the path to ground to provide a 12V signal to energize the brake light 316 or a logic level zero that keeps the circuit grounded to ensure that the brake light 316 is not energized.

Once an accelerometer chip 306 is selected, a threshold voltage must be determined where the brake light 316 would be turned off even if it were reading a deceleration. This was to avoid small changes in the accelerometer voltage output, so that the light 316 would not turn on at the slightest change in momentum. To find this threshold voltage value, a DI-194RS Data Logger Starter Kit was connected it to the accelerometer chip 306 and the prototype was driven around.

Figure 6:
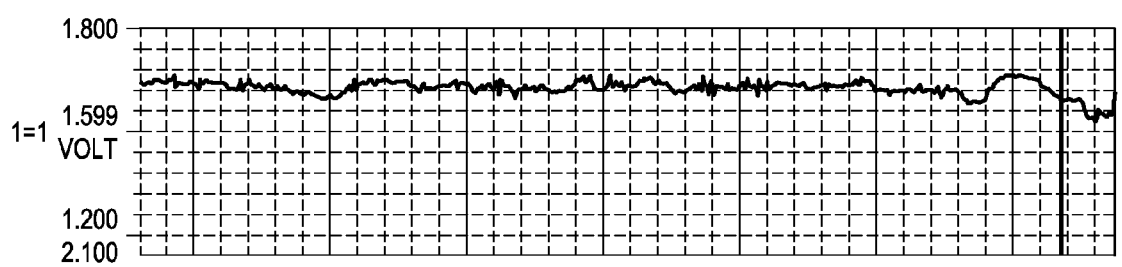
FIG. 6 is a graph illustrating the output response of a DI-194RS Data Logger.

The resting voltage of the accelerometer 306 is the voltage the accelerometer 306 produces when it is stationary and parallel to the earth's surface, meaning no movement within the accelerometer 306 is detected. The resting voltage is a constant value given by Dimension Engineering on the accelerometer's datasheet. Deviation from this constant value is normal and can sometimes be as large as 10%. The resting voltage was measured using a digital multi-meter to verify how much deviation the accelerometer chip 306 contained. The multi-meter reading showed 1.645V. Knowing this value allowed the changes detected by the accelerometer chip 306 to be determined when a positive or negative acceleration occurred during the test run in an automobile. FIG. 6 is a graph illustrating the output response of the DI-194RS Data Logger set to read at 1.645V.

Since the ATMEGA48 contains a 10-bit ADC, the digital value for the resting voltage is found using the following equation:

$$RestingVoltageDigitalValue = \left[\frac{1.645\ V - \Delta\ V}{VoltagePoweringMicrocontrollersADC}\right] * 2^{\#bitADC}.$$

Therefore, the Resting Voltage Digital Value (RVDV) is:

$$RVDV = \left[\frac{1.645\ V - 0\ V}{3.3\ V}\right] * 2^{10} = 510.$$

$\Delta V$ represents the change in the voltage of the accelerometer. If the accelerometer detects a deceleration, then the voltage produced by it will decrease. If the accelerometer measures an acceleration, then the voltage produced by it will increase. Therefore, any voltage less than 1.645V is considered a deceleration and any voltage above 1.645V is characterized as an acceleration.

The microcontroller code can now be written based on accurate digital values. From this information, it can be derived that a standard deceleration produces a change in the resting voltage of about 200 mV to 300 mV. A very hard deceleration produces a change of about 500 mV. To ignore the small changes in voltage, so that the brake light system would not operate at the slightest change, 117 mV is chosen as the threshold value. Essentially, any voltage read between 1.645V and (1.645V−0.117V)=1.528V would not send a 12V signal out to the brake light. A voltage greater than 1.645V, represents positive acceleration, therefore a 12V signal would not be sent to the brake light either. The Threshold Digital Value (TDV) is given by:

$$TDV = \left[\frac{1.645\ V - 0.117\ V}{3.3\ V}\right] * 2^{10} = 474.$$

The Brake Light Energize Digital Value (LEDV) is determined by subtracting the Threshold Digital Value from the Resting Voltage Digital Value and yields a digital value of 36:

LEDV=RVDV−TDV=510−474=36.

Using this value, two simple conditional statements are constructed within the microcontroller code. If the Resulting Digital Value (RDV) is greater than or equal to the LEDV, which is 36 based on a threshold voltage of 0.117V, then the brake light is energized. If the RDV is less than the LEDV, then the brake light is not energized.

RDV<LEDV:Do Not Energize Brake Light

RDV>=LEDV:Energize Brake Light

Since signed numbers are in the microcontroller code, negative digital values do not present a problem. The following sample calculations will show how the accelerometer chip and the ATMEGA48 microcontroller's Analog-to-Digital Converter interact.

Example 1

The voltage read from the accelerometer is 1.57V. Therefore, $\Delta V$=1.66V−1.57V=0.090V (representing a small change in deceleration). The Current Digital Value (CDV) is:

$$CDV = \left[\frac{1.66\ V - 0.090\ V}{3.3\ V}\right] * 2^{10} = 487.$$

The Resulting Digital Value (RDV) is the Resting Voltage Digital Value minus the Current Digital Value:

RDV=RVDV−CDV=510−487=23.

Since the RDV is less than the LEDV, (23<36), the brake light is not energized.

Example 2

The voltage read from the accelerometer is 1.435V. Therefore, $\Delta V$=1.66V−1.435V=0.225V (representing a normal change in deceleration). The Current Digital Value (CDV) is:

$$CDV = \left[\frac{1.66\ V - 0.225\ V}{3.3\ V}\right] * 2^{10} = 445$$

The Resulting Digital Value (RDV) is the Resting Voltage Digital Value minus the Current Digital Value:

RDV=RVDV−CDV=510−445=65.

Since the RDV is greater than the LEDV, (65>36), the brake light is energized.

Example 3

The voltage read from the accelerometer is 1.06V. Therefore, $\Delta V$=1.66V−1.06V=0.600V (representing an extreme change in deceleration). The Current Digital Value (CDV) is:

$$CDV = \left[\frac{1.66\ V - 0.600\ V}{3.3\ V}\right] * 2^{10} = 329$$

The Resulting Digital Value (RDV) is the Resting Voltage Digital Value minus the Current Digital Value:

RDV=RVDV−CDV=510−329=181.

Since the RDV is greater than the LEDV, (181>36), the brake light is energized.

Example 4

The voltage read from the accelerometer is 1.86V. Therefore, $\Delta V$=1.66V−1.86V=−0.200V (representing a positive acceleration). The Current Digital Value (CDV) is:

$$CDV = \left[\frac{1.66\ V - (-0.200\ V)}{3.3\ V}\right] * 2^{10} = 577$$

The Resulting Digital Value (RDV) is the Resting Voltage Digital Value minus the Current Digital Value:

RDV=RVDV−CDV=510−577=−67.

Since the RDV is less than the LEDV, (−67<36), the brake light is not energized.

To avoid the complications of writing and developing microcontroller assembly language code, an STK-600 development board that implements MCS-BASCOM BASIC programming language was used to program the microcontroller. The STK-600 offers different socket packages for different Atmel microcontroller chip specifications. MCS-BASCOM provides a user-friendly graphical interface that removes the hassles of assembly language programming. MCS-BASCOM takes multiple lines of code and minimizes user programming by simplifying commands to perform the same task. It is not necessary to initialize the stack, I/O registers, ADC registers, allocate memory and memory buffers or any other of the tedious tasks involved in microcontroller design coding. MCS-BASCOM libraries take care of all of these tasks for the user.

Furthermore, a program called AVR Studio4 imports an object code from MCS-BASCOM which programs the microcontroller through the STK-600 development board. AVR Studio4 also allows for real-time simulation and debugging, which proved extremely helpful during testing phases. The microcontroller code developed for the prototype used an interrupt service routine based on repetitive Timer 1 overflowing to take incremental samples of the data received from the accelerometer chip. Using an 8 MHz crystal, coupled with two 30 μF capacitors, a frequency of roughly 8 MHz was generated for the microcontroller. The period of the crystal is given by:

$$T = \frac{1}{f} = \frac{1}{8,000,000} \text{ Hz} = 0.125 \text{ } \mu\text{sec}$$

In order to take accurate samples from the accelerometer, the Timer 1 overflow value for the microcontroller's analog-to-digital converter needs to be calculated. This value is found by dividing the sampling period by the period of the crystal. Initially, the microprocessor code was set to poll every 1 ms. Using a 1 ms sampling period made the brake light response too sensitive. Next, the sampling period was changed to produce an interrupt service routine every 10 ms. The sensitivity was decreased, but was still too responsive. After more experimentation with the overflow timing, a 100 ms polling value produced optimal results. Using a 100 ms sampling period yields:

$$Timer1OverflowValue = \frac{100e^{-2} \text{ sec}}{0.125e^{-6} \text{ sec}} = 800e^{+2} = C3500 Hex$$

This hexadecimal number corresponds to the Timer 1 overflow value used in the BASCOM code for the interrupt service routine. Furthermore, the speed of the asynchronous clock was reduced by using a pre-scaler of 128 for the analog-to-digital converter. This means that the analog-to-digital converter operates at a counter speed of 62,500 clock ticks every period.

Figure 7A:
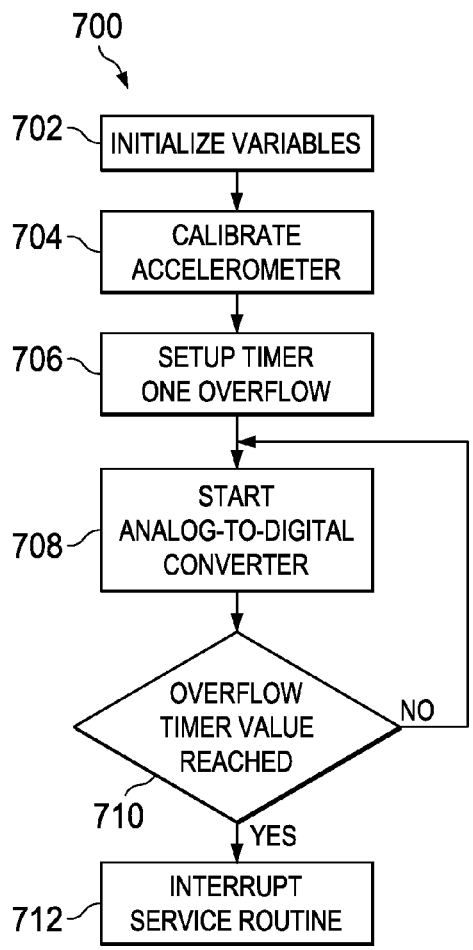
FIG. 7A is a flow chart of the algorithm for a microprocessor in accordance with another embodiment of the present invention.

Now referring to FIG. 7A, a flow chart of the algorithm for a microprocessor 700 in accordance with another embodiment of the present invention is shown. The variables are initialized in block 702, the accelerometer is calibrated in block 704, and the Timer1 overflow is setup in block 706. The analog-to-digital converter is started in block 708. The analog-to-digital converter continues until the overflow timer value is reached, as determined in decision block 710. If the overflow timer value is reached, as determined in decision block 710, the interrupt service routine 712 is run as described in reference to FIG. 7B.

Figure 7B:
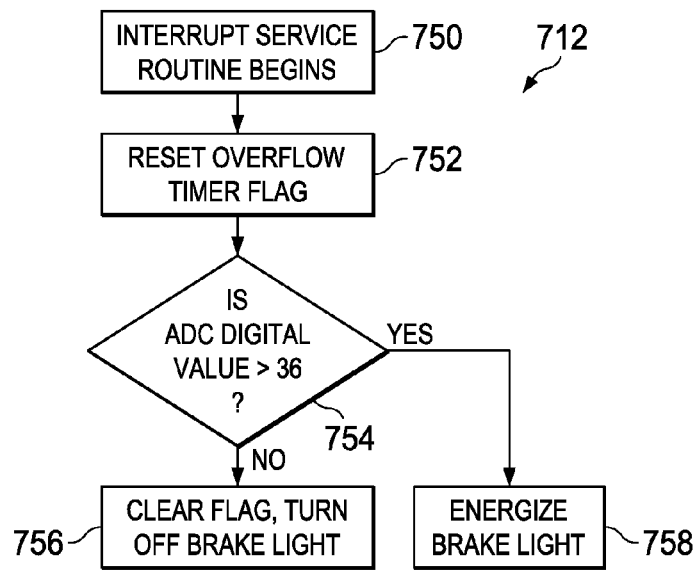
FIG. 7B is a flow chart of the algorithm for an interrupt service routine in accordance with another embodiment of the present invention.

Referring now to FIG. 7B, a flow chart of the algorithm for an interrupt service routine 712 in accordance with another embodiment of the present invention is shown. The interrupt service routine 712 begins in block 750 and the overflow timer flag is reset in block 752. If the ADC digital value is less than or equal to 36, as determined in decision block 754, the flag is cleared and the brake lights are turned off in block 756. If, however, the ADC digital value is greater than 36, as determined in decision block 754, the brake lights are energized in block 758.

The code for FIGS. 7A and 7B is as follows:

```
'********************************************************************
'*                                                                  *
'* Title         :  Microprocessor Control of a Vehicle Brake Light System  *
'* Version       :  Final Working Version                           *
'* Last Updated  :  04.20.2009                                      *
'* Target        :  ATMega48                                        *
'* Author        :  Automotive Safety Innovations                   *
'* Program code  :  BASCON AVR                                      *
'* Hardware req. :  STK-600 Development Board                       *
'* Description   :  Program Code necessary for operation of LED brake light *
'*                  system using the microcontrollers ADC           *
'********************************************************************
'*************************
'* compiler instructions    *
'*************************
$regfile = "m48def.dat"
$crystal = 80000000
'*********
'* alias  *
'*********
Brakelight Alias Pinb.0
'*********
'* Flags  *
'*********
Dim Flag As Bit
'*************
```

-continued

```
'* Variables    *
'**************
Dim Temp As Integer
Dim Temp2 As Integer
Dim Temp3 As Integer
Dim Analogvalue As Integer
Dim Analogvalue1 As Integer
Dim Analogvalue2 As Integer
Dim Digivalue As Integer
'**************
'* interrupts   *
'**************
Enable Interrupts
Enable Ovf1
On Ovf1 Get_new_adc
'***************
'* peripherals  *
'***************
Config Adc = Single , Prescaler = 128 , Reference = AVCC
Config Timer1 = Timer , Prescale = 1
Config Pinc,0 = Input
Config Pinb,0 = Output
'*****************************************************************
'* Main loop *
'* Description:  First we initialize the variables to zero. The main loop     *
'*               will then continuously check the flag to determine which     *
'*               state to jump                                                *
'*                                                                            *
'* Global Variables:  Digivalue,Analog_value,Analog_value1,Analog_value2,Temp,*
'*                    Temp2                                                   *
'* Global bit:        Flag                                                    *
'* Local Variables:   -                                                       *
'* Local bit:         -                                                       *
'*****************************************************************
Start Adc
Timer1 = &HC3500
'*****************************
'*    Initialize all variables     *
'*****************************
Digivalue = 0
Analogvalue = 0
Temp = 0
Flag = 0
Temp2 = 0
Analogvalue1 = 0
Analogvalue2 = 0
Main_loop:
Do
   If Flag = 0 Then
      Goto Main_loop
   End If
'*****************************
'*   Decide which state to jump   *
'*****************************
   Temp = 510 - Digivalue
   If Temp < 36 Then
      Brakelight = 0
      Flag = 0
   End If
   If Temp >= 36 Then
      Brakelight = 1
      Flag = 0
   End If
Loop
'*****************************************************************
'* get_new_adc                                                                *
'*                                                                            *
'* Description:  On the timer compare interrupt, it will read the new ADC     *
'*               value and turn onthe new_value flag                          *
'*                                                                            *
'* Global Variables:  Digivalue,Analog_value,Analog_value1,Analog_value2,Temp,*
'*                    Temp2                                                   *
'* Global bit:        Flag                                                    *
'* Local Variables:   -                                                       *
'* Local bit:         -                                                       *
'*****************************************************************
Get_new_adc:
   Timer1 = &HC3500
   Analogvalue = Getadc(0)
   Analogvalue1 = Getadc(0)
```

```
Analogvalue2 = Getadc(0)
Temp2 = Analogvalue + Analogvalue1
Temp3 = Temp2 + Analogvalue2
Digivalue = Temp3 / 3
Flag = 1
Return
End
```

Figure 8:
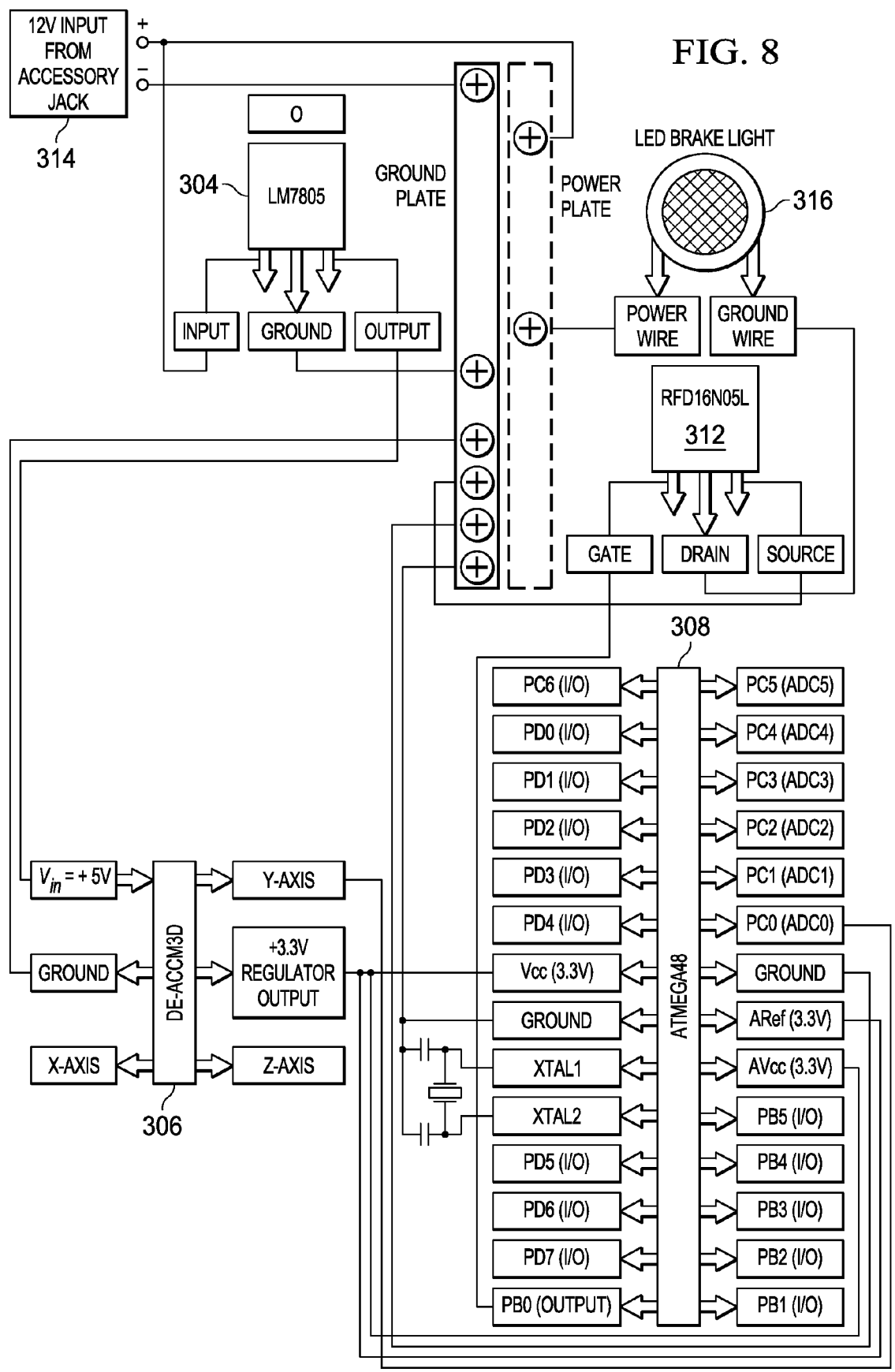
FIG. 8 is a schematic diagram of a PCB layout with pin connections in accordance with one embodiment of the present invention.
Figure 9:
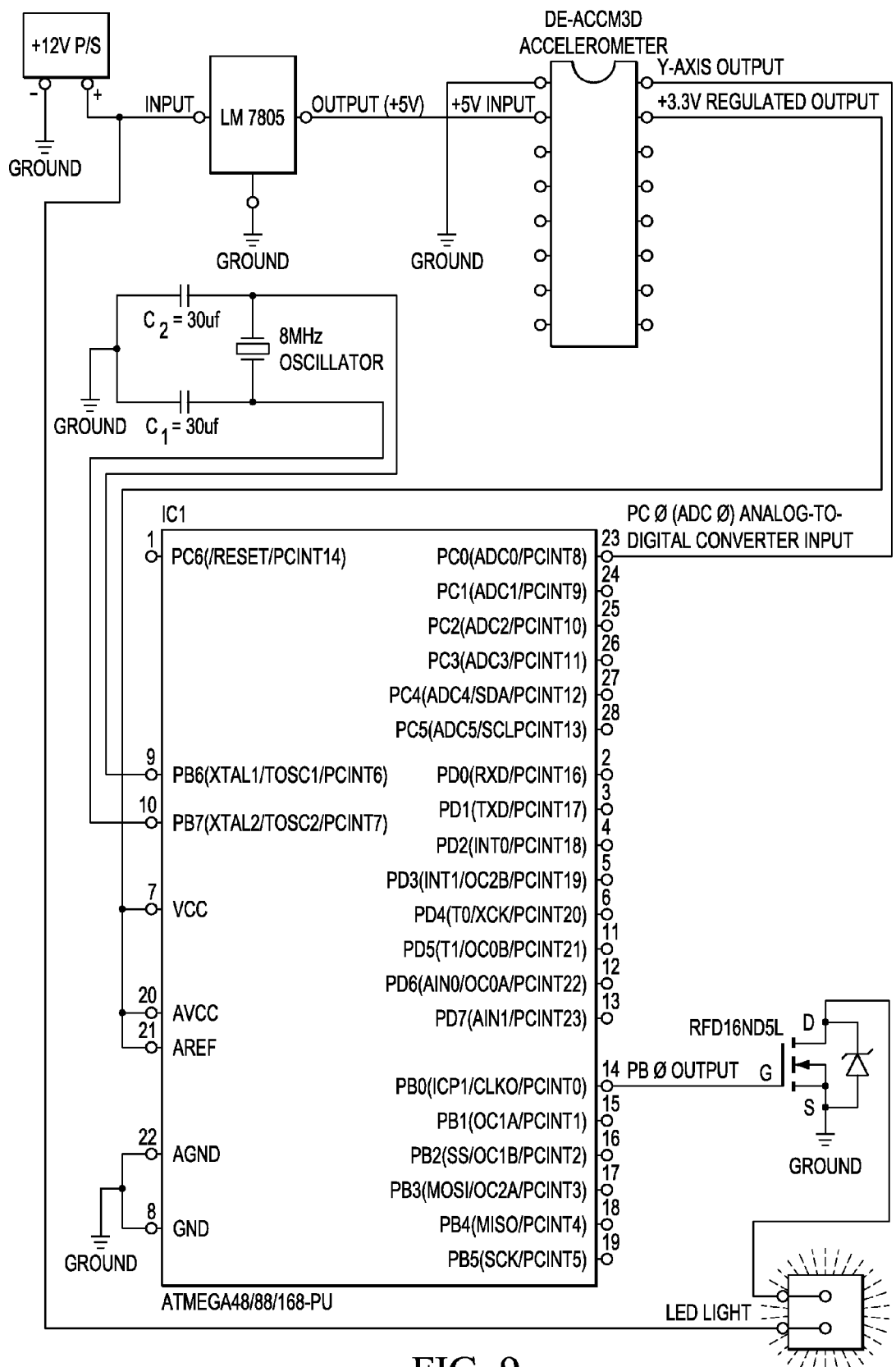
FIGS. 9 and 10 are schematic diagrams of professional PCB layouts using Eagle 5.3 software in accordance with another embodiment of the present invention.
Figure 10:
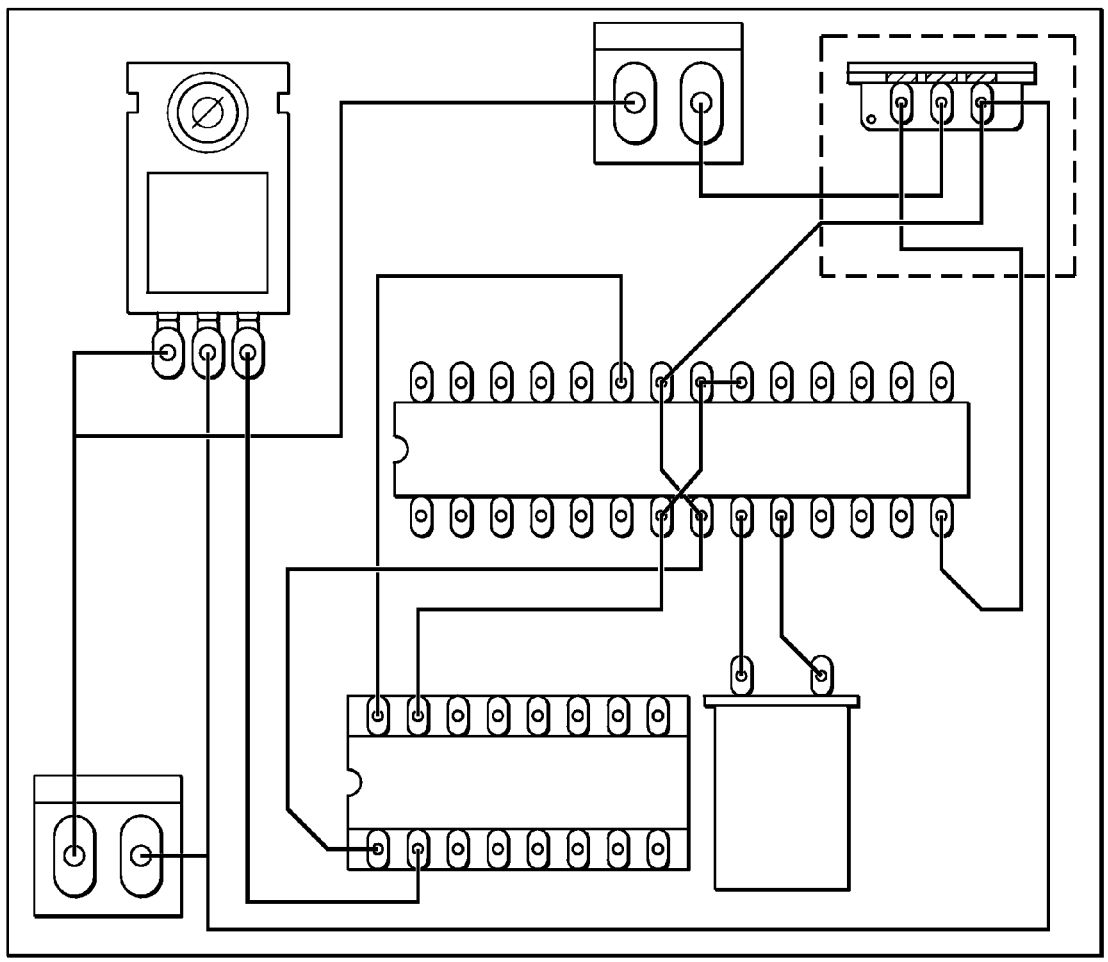

FIG. 8 is a schematic diagram of a PCB layout with pin connections in accordance with one embodiment of the present invention. FIGS. 9 and 10 are schematic diagrams of professional PCB layouts using Eagle 5.3 software in accordance with another embodiment of the present invention.

The prototype was built using specific components that met necessary criteria based on the voltage requirements of the 12V/20 A accessory socket, the LED brake light, and the +3.3V regulator pin on the accelerometer. The reason the LM7805 was used was to step down the 12V input to a constant 5V dc signal. This allowed the accelerometer to be powered to ensure that the response of the accelerometer was accurate. Since its performance is based on the input voltage, it was crucial for the chip to receive a consistent input voltage to produce consistent output voltages. Furthermore, 5V is necessary to produce 3.3V at the regulator pin of the accelerometer which in turn powers the ATMEGA48 microcontroller. Also, embedded within our microcontroller code is the 3.3V divisor which is part of the digital value calculations. If any of these voltages stray from their designated value the circuit will not operate correctly.

The limitations of the accelerometer chip are ±3 g (force of gravity). A deceleration of 3 g is practically impossible to reach in an automobile. A simulated calculation to see the results if it were to happen will now be discussed to determine the limitations of the voltage produced by the accelerometer and the digital value produced by the microcontroller.

Using 5V as the operating voltage of the accelerometer provides a sensitivity of 666 mV according to its datasheet. To find the −3 g voltage, the following equation is used:

$$0.666V * -3\ g = -1.998V$$

$$1.66V - (-1.998V) = 3.658V$$

Using the equation given in the prototype design calculations yields a digital value of:

$$\left[\frac{3.658}{3.3V}\right] * 2^{10} = 1135$$

Since (1135>36), the brake light is energized. Conclusively, the maximum deceleration voltage that the accelerometer chip can produce is 3.658V. The maximum digital value that the microcontroller will output is 1135. The maximum positive acceleration voltage produced by the accelerometer chip and the minimum digital value produced by the microcontroller are of no consequence to our circuit since positive accelerations have no effect on the brake light.

The only other device limitation is the sampling rate of the microcontroller's Analog-to-Digital converter. If the sampling rate designated in the programming code is faster than the microcontroller can process, then inaccurate results will occur.

The prototype was field tested to provide validation and verification of the performance of the system within an automobile. The following test plan outlines the criterion used during the second field trial test run.

Performance Criteria:
All components within the circuit function as expected after construction
The system switches correctly between an energized and non-energized state when the threshold voltage is breached
Test Vehicle:
2003 Honda Civic EX, 1.6L SOHC 4-Cylinder Sport Coupe
Testing Procedure:
Connect LED brake light to the positive (red) and negative (black) banana connections
Plug prototype circuit into 12V/20 A accessory jack
Increase speed of vehicle to 45 mph-60 mph
Downshift vehicle The prototype system functioned as expected. Troubleshooting was not necessary to run the system correctly and no improvements are necessary to generate the signal at the brake light when the automobile is downshifted signifying the threshold voltage is exceeded.

It is completely feasible to construct this circuit using different parts as long as the voltage considerations are taken into account. Every part effectively needs to be adaptable to every component before and after it to form a cohesive linear system.

Since the circuit is driven by component voltages, having correct input to output voltages is very important. To ensure the correct operation of the device, each part must be tested for correct voltage levels at the input and output. The table below describes in detail the sample data obtained to provide quality assurance.

Hypothesis Testing $H_0 = \mu \leq 1.645$ (Signifying correct operation based on a deceleration)

$H_1 = \mu > 1.645$ (Signifying a positive acceleration)

Measured Test Data

| Test Run | Accelerometer Voltage |
|---|---|
| 1 | 1.582402 |
| 2 | 1.512001 |
| 3 | 1.519907 |
| 4 | 1.546180 |
| 5 | 1.569713 |
| 6 | 1.564616 |
| 7 | 1.523361 |
| 8 | 1.509485 |
| 9 | 1.476905 |
| 10 | 1.572594 |
| 11 | 1.476924 |
| 12 | 1.681908 |
| 13 | 1.542941 |
| 14 | 1.454883 |
| 15 | 1.520220 |

-continued

| Test Run | Accelerometer Voltage |
|---|---|
| 16 | 1.598342 |
| 17 | 1.574645 |
| 18 | 1.588597 |
| 19 | 1.553672 |
| 20 | 1.546317 |
| 21 | 1.560782 |
| 22 | 1.504472 |
| 23 | 1.520868 |
| 24 | 1.509697 |
| 25 | 1.527147 |
| 26 | 1.531227 |
| 27 | 1.560496 |
| 28 | 1.565971 |
| 29 | 1.536787 |
| 30 | 1.540518 |
| 31 | 1.561253 |
| 32 | 1.586091 |
| 33 | 1.435820 |
| 34 | 1.487042 |
| 35 | 1.569150 |
| 36 | 1.459177 |
| 37 | 1.786740 |
| 38 | 1.520412 |
| 39 | 1.565716 |
| 40 | 1.557960 |
| 41 | 1.630802 |
| 42 | 1.615613 |
| 43 | 1.614754 |
| 44 | 1.583250 |
| 45 | 1.603267 |
| 46 | 1.527216 |
| 47 | 1.483178 |
| 48 | 1.554402 |
| 49 | 1.505251 |
| 50 | 1.518777 |

X-Bar=1.542788965
Standard Deviation=0.047842488
Upper Confidence Level=1.555232668
Lower Confidence Level=1.530345261

Figure 11:
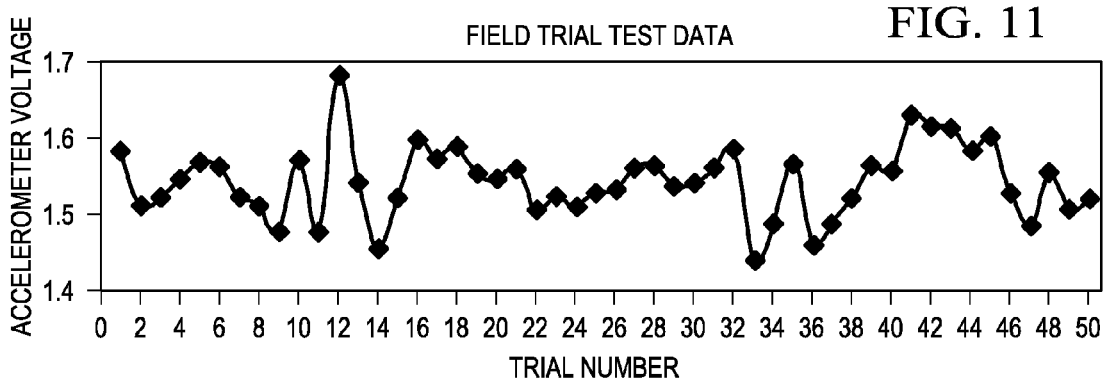
FIG. 11 is a scatter plot graph showing field trial test data in accordance with one embodiment of the present invention.

FIG. 11 is a scatter plot graph showing field trial test data in accordance with one embodiment of the present invention.

In one embodiment of the present invention, the final product will contain:
  A box to hold the circuit in the correct orientation with the earth
  An input wire (including a ground wire) that can be run to the battery of the motor vehicle
  An output wire (including a ground wire) that can be run to the brake light system of a motor vehicle
  A complete circuit built on a PCB that includes:
  LM7805 Voltage Regulator
  DE-ACCM3D Accelerometer Chip
  ATMEGA48 or comparable Microcontroller
  RFD16N05L Logic Level, n-Channel MOSFET or comparable MOSFET
  All necessary connections already made
  Mounting Bracket to firmly secure the device to a motor vehicle's chassis The recommended location for securing the device is the front end firewall that separates the passenger compartment from the engine compartment.

To effectively control the operation of the circuit, the following steps should be taken. Simple connection with a DC power supply should provide the necessary voltages to ensure correct operation. Each output pin, where accurate voltages are crucial, should be measured with a Digital Multi-Meter set to the dc function to obtain readings.

Using a DC power supply, the LM-7805 should receive at least +8V on its input leg to produce +5V on its output leg. There will be a slight variation of ±5 to 10 mV at the output of the LM7805.

The DE-ACCM3D Accelerometer Chip should receive +5V from the LM7805 or a DC power supply to produce the necessary sensitivity of 666 mV/g and the +3.3V output from the on-board regulator. The accelerometer's on-board regulator produces an accurate and steady +3.3317V when +5V powers it.

The ATMEGA48 is powered by this +3.3317V at its pin connections. The pins are very important because they control the division factor within the Analog-to-Digital converter. Ensuring that these two pins are receiving roughly +3.33V is crucial for correct operation.

The RFD16N05L Logic Level, n-channel Power MOSFET operates as an inverting switch. It is capable of controlling up to 50V across its gate, source, and drain. This component does not require exact voltage to perform correctly. Its voltage is based on the input voltage of the circuit (battery voltage) and consumes very little power when operating. The RFD16N05L MOSFET allows voltage to enter the brake light system based on the programming code of the microcontroller (whether it is sent a logic1 or logic0) by opening and closing the path to ground.

Project Quality Plan Checklist
  Supply at least +8V dc to the LM-7805 Voltage Regulator on its input pin
  Use the Digital Multi-Meter set to dc (be sure that the DMM is properly grounded) and measure the voltage on the output pin of the LM-7805 Voltage Regulator. It should equal roughly +5V
  Supply +5V dc to the DE-ACCM3D Accelerometer Chip on its pin
  Use the Digital Multi-Meter set to dc (be sure that the DMM is properly grounded) and measure the voltage on the BYP (Regulated Voltage Output) pin. It should equal roughly +3.33V
  Use the Digital Multi-Meter set to dc (be sure that the DMM is properly grounded) to ensure that +3.33V is being sent to the microcontroller at the pins
  Be sure that the RFD16N05L Logic Level MOSFET is connected correctly with the gate pin running to the chosen output pin (in our design PB0), the source pin running to ground, and the drain pin connected to the positive lead wire of the LED brake light
  Ensure that the LED brake light negative lead wire is run to ground
  Once the entire circuit is constructed, test all ground connections for continuity using the Digital Multi-Meter set to continuity. A continuous ground connection should produce an audio signal and display the word "OPEN"

REFERENCES

1. *AVR Freaks*. (2009). Retrieved January 2009, from http://www.avrfreaks.net
2. *AVR® 8-Bit RISC*. (2009). Retrieved January 2009, from http://www.atmel.com/products/AVR
3. Farrel, J. (2006). *Programming Logic and Design, Introductory*. Boston, Mass.: Thomson Publishing
4. *Ford Motor Company December Sales Call Transcript—Seeking Alpha*. (n.d.). Retrieved from http://seekingalpha.com/article/113286-ford-motor-company-december-sales-call-transcript
5. *Home—MCS Electronics*. (n.d.). Retrieved from http://www.mcselec.com 6. Huang, H.-W. (2006). *The HCS12/9S12: An Introduction to Software and Hardware Interfacing*. Clifften Park, N.Y.: Thomson Publishing
7. Theodore F. Bogart Jr, J. S. (2004). *Electronic Devices and Circuits*. Upper Saddle River, N.J.: Pearson Prentice Hall
8. U.S. Department of Transportation. (n.d.). Retrieved from http://www.dot.gov/new/index.html It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for energizing one or more brake lights on a vehicle without an operator of the vehicle applying a brake of the vehicle, the method comprising:
   determining an acceleration and an acceleration rate of the vehicle;
   activating a traction control of the vehicle whenever the acceleration rate equals or exceed a skid threshold;
   energizing the brake lights on the vehicle whenever the acceleration of the vehicle equals or exceeds a braking threshold; and
   deenergizing the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

2. The method as recited in claim 1, wherein the brake lights are not energized when the vehicle is in reverse unless the operator applies the brake of the vehicle.

3. The method as recited in claim 1, further comprising activating an air bag whenever the acceleration rate equals or exceeds a collision threshold.

4. The method as recited in claim 1, further comprising providing a skid warning to the operator whenever the acceleration rate equals or exceeds the skid threshold.

5. The method as recited in claim 1, further comprising:
   logging the acceleration and a status of the brake lights;
   providing the acceleration and the status of the brake lights to one or more vehicle systems, one or more vehicles within a specified range, a remote data processing system, or a combination thereof;
   engaging or disengaging one or more cylinders in the vehicle based on the acceleration;
   providing the logged data to an onboard diagnostics port; or
   executing one or more start up or initialization procedures.

6. The method as recited in claim 1, wherein:
   the vehicle comprises a car, a truck, a van, a trailer, a motorcycle, a recreational vehicle, a motorized cart, an industrial or construction vehicle, a motorized equipment or a combination thereof; or
   the acceleration rate is determined by an inertia sensor or a G-force sensor.

7. A method for energizing one or more brake lights on a vehicle without an operator of the vehicle applying a brake of the vehicle, the method comprising:
   determining an acceleration and an acceleration rate of the vehicle;
   activating an air bag whenever the acceleration rate equals or exceeds a collision threshold;
   providing a skid warning to the operator whenever the acceleration rate equals or exceeds a skid threshold;
   energizing the brake lights on the vehicle whenever the acceleration of the vehicle equals or exceeds a braking threshold; and
   deenergizing the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

8. The method as recited in claim 7, wherein the brake lights are not energized when the vehicle is in reverse unless the operator applies the brake of the vehicle.

9. The method as recited in claim 7, further comprising activating a traction control of the vehicle whenever the acceleration rate equals or exceed the skid threshold.

10. The method as recited in claim 7, further comprising:
    logging the acceleration and a status of the brake lights;
    providing the acceleration and the status of the brake lights to one or more vehicle systems, one or more vehicles within a specified range, a remote data processing system, or a combination thereof;
    engaging or disengaging one or more cylinders in the vehicle based on the acceleration;
    providing the logged data to an onboard diagnostics port; or
    executing one or more start up or initialization procedures.

11. The method as recited in claim 7, wherein:
    the vehicle comprises a car, a truck, a van, a trailer, a motorcycle, a recreational vehicle, a motorized cart, an industrial or construction vehicle, a motorized equipment or a combination thereof; or
    the acceleration rate is determined by an inertia sensor or a G-force sensor.

12. An apparatus for energizing one or more brake lights on a vehicle without an operator of the vehicle applying a brake of the vehicle, the apparatus comprising:
    an accelerometer that measures an acceleration of the vehicle;
    a voltage regulator connected to a power supply and the accelerometer;

a switch connected between the brake lights and a ground plane of the vehicle; and a processor communicably coupled to the accelerometer and the switch, wherein the processor: (1) energizes the brake lights on the vehicle whenever the measured acceleration of the vehicle equals or exceeds a braking threshold, and (2) deenergizes the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

13. The apparatus as recited in claim 12, wherein the switch is further connected to a brake pedal of the vehicle.

14. The apparatus as recited in claim 12, wherein the processor does not energize the brake lights when the vehicle is in reverse unless the operator applies the brakes.

15. The apparatus as recited in claim 12, wherein the accelerometer further measures an acceleration rate of the vehicle.

16. The apparatus as recited in claim 15, wherein the processor activates an air bag whenever the measured acceleration rate equals or exceeds a collision threshold.

17. The apparatus as recited in claim 15, wherein the processor provides a skid warning to the operator whenever the acceleration rate equals or exceeds a skid threshold.

18. The apparatus as recited in claim 15, wherein the processor activates a traction control of the vehicle whenever the acceleration rate equals or exceed a skid threshold.

19. The apparatus as recited in claim 12, wherein the processor:
   logs the acceleration and a status of the brake lights;
   provides the acceleration and the status of the brake lights to one or more vehicle systems, one or more vehicles within a specified range, a remote data processing system, or a combination thereof;
   engages or disengages one or more cylinders in the vehicle based on the acceleration;
   provides the logged data to an onboard diagnostics port; or
   executes one or more start up or initialization procedures.

20. The apparatus as recited in claim 12, wherein:
   the vehicle comprises a car, a truck, a van, a trailer, a motorcycle, a recreational vehicle, a motorized cart, an industrial or construction vehicle, a motorized equipment or a combination thereof; or
   the acceleration rate is determined by an inertia sensor or a G-force sensor.

21. A kit for retrofitting a vehicle to energize one or more brake lights on the vehicle without an operator of the vehicle applying a brake of the vehicle, the apparatus comprising:
   an enclosure suitable for installation within the vehicle;
   an accelerometer disposed within the enclosure that measures an acceleration of the vehicle;
   a switch disposed within the enclosure;
   a processor disposed within the enclosure that is communicably coupled to the accelerometer and the switch, wherein the processor: (1) energizes the brake lights on the vehicle using the switch whenever the measured acceleration of the vehicle equals or exceeds a braking threshold, and (2) deenergizes the brake lights on the vehicle using the switch whenever: (a) the brake lights are energized, (b) the acceleration of the vehicle is less than the braking threshold, (c) a specified period of time has elapsed since the brake lights were energized, and (d) the operator is not applying the brake of the vehicle;
   a set of terminals on an exterior of the enclosure that are connected to the voltage regulator and the switch; and
   a set of wires to connect the set of terminals to a power supply of the vehicle, the brake lights of the vehicle, and a ground plane of the vehicle.

22. The kit as recited in claim 21, wherein the processor does not energize the brake lights when the vehicle is in reverse unless the operator applies the brakes.

23. The kit as recited in claim 21, wherein the accelerometer further measures an acceleration rate of the vehicle.

24. The kit as recited in claim 23, wherein the processor activates an air bag whenever the measured acceleration rate equals or exceeds a collision threshold.

25. The kit as recited in claim 23, wherein the processor provides a skid warning to the operator whenever the acceleration rate equals or exceeds a skid threshold.

26. The kit as recited in claim 23, wherein the processor activates a traction control of the vehicle whenever the acceleration rate equals or exceed a skid threshold.

27. The kit as recited in claim 21, wherein the processor:
   logs the acceleration and a status of the brake lights;
   provides the acceleration and the status of the brake lights to one or more vehicle systems, one or more vehicles within a specified range, a remote data processing system, or a combination thereof;
   engages or disengages one or more cylinders in the vehicle based on the acceleration;
   provides the logged data to an onboard diagnostics port; or
   executes one or more start up or initialization procedures.

28. The kit as recited in claim 21, wherein:
   the vehicle comprises a car, a truck, a van, a trailer, a motorcycle, a recreational vehicle, a motorized cart, an industrial or construction vehicle, a motorized equipment or a combination thereof; or
   the acceleration rate is determined by an inertia sensor or a G-force sensor.

29. A system for energizing one or more brake lights on a vehicle without an operator of the vehicle applying a brake of the vehicle, the apparatus comprising:
   the vehicle having a power supply and the brake lights;
   an accelerometer disposed within the vehicle that measures an acceleration of the vehicle;
   a voltage regulator connected to a power supply and the accelerometer;
   a switch connected between the brake lights and a ground plane of the vehicle; and
   a processor disposed with the vehicle and communicably coupled to the accelerometer and the switch, wherein the processor: (1) energizes the brake lights on the vehicle whenever the measured acceleration of the vehicle equals or exceeds a braking threshold, and (2) deenergizes the brake lights on the vehicle whenever: (a) the brake lights are energized, (b) the acceleration of the vehicle is less than the braking threshold,
   (c) a specified period of time has elapsed since the brake lights were energized, and (d) the operator is not applying the brake of the vehicle.

30. The system as recited in claim 29, wherein the switch is further connected to a brake pedal of the vehicle.

31. The system as recited in claim 29, wherein the processor does not energize the brake lights when the vehicle is in reverse unless the operator applies the brakes.

32. The system as recited in claim 29, wherein the accelerometer further measures an acceleration rate of the vehicle.

33. The system as recited in claim 32, wherein the processor activates an air bag whenever the measured acceleration rate equals or exceeds a collision threshold.

34. The system as recited in claim 32, wherein the processor provides a skid warning to the operator whenever the acceleration rate equals or exceeds a skid threshold.

35. The system as recited in claim 32, wherein the processor activates a traction control of the vehicle whenever the acceleration rate equals or exceed a skid threshold.

36. The system as recited in claim 32, wherein the processor:
    logs the acceleration and a status of the brake lights;
    provides the acceleration and the status of the brake lights to one or more vehicle systems, one or more vehicles within a specified range, a remote data processing system, or a combination thereof;
    engages or disengages one or more cylinders in the vehicle based on the acceleration;
    provides the logged data to an onboard diagnostics port; or
    executes one or more start up or initialization procedures.

37. The system as recited in claim 32, wherein:
    the vehicle comprises a car, a truck, a van, a trailer, a motorcycle, a recreational vehicle, a motorized cart, an industrial or construction vehicle, a motorized equipment or a combination thereof; or
    the acceleration rate is determined by an inertia sensor or a G-force sensor.

38. An apparatus for energizing one or more brake lights on a vehicle without an operator of the vehicle applying a brake of the vehicle, the apparatus comprising:
    an accelerometer that measures an acceleration and an acceleration rate of the vehicle; and
    a processor communicably coupled to the accelerometer, wherein the processor: (1) energizes the brake lights on the vehicle whenever the measured acceleration of the vehicle equals or exceeds a braking threshold, (2) activates a traction control of the vehicle whenever the acceleration rate equals or exceed a skid threshold, and (3) deenergizes the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

39. The apparatus as recited in claim 38, further comprising a voltage regulator connected to a power supply and the accelerometer.

40. The apparatus as recited in claim 38, further comprising a switch controlled by the processor, wherein the switch is connected between the brake lights and a ground plane.

41. The apparatus as recited in claim 40, wherein the switch is further connected to a brake pedal of the vehicle.

42. The apparatus as recited in claim 38, wherein the processor does not energize the brake lights when the vehicle is in reverse unless the operator applies the brakes.

43. The apparatus as recited in claim 38, wherein the processor activates an air bag whenever the measured acceleration rate equals or exceeds a collision threshold.

44. The apparatus as recited in claim 38, wherein the processor provides a skid warning to the operator whenever the acceleration rate equals or exceeds the skid threshold.

45. The apparatus as recited in claim 38, wherein the processor:
    logs the acceleration and a status of the brake lights;
    provides the acceleration and the status of the brake lights to one or more vehicle systems, one or more vehicles within a specified range, a remote data processing system, or a combination thereof;
    engages or disengages one or more cylinders in the vehicle based on the acceleration;
    provides the logged data to an onboard diagnostics port; or
    executes one or more start up or initialization procedures.

46. The apparatus as recited in claim 38, wherein:
    the vehicle comprises a car, a truck, a van, a trailer, a motorcycle, a recreational vehicle, a motorized cart, an industrial or construction vehicle, a motorized equipment or a combination thereof; or
    the rate of acceleration is determined by an inertia sensor or a G-force sensor.

47. An apparatus for energizing one or more brake lights on a vehicle without an operator of the vehicle applying a brake of the vehicle, the apparatus comprising:
    an accelerometer that measures an acceleration and an acceleration rate of the vehicle; and
    a processor communicably coupled to the accelerometer, wherein the processor: (1) energizes the brake lights on the vehicle whenever the measured acceleration of the vehicle equals or exceeds a braking threshold, (2) provides a skid warning to the operator whenever the acceleration rate equals or exceeds a skid threshold, and (3) deenergizes the brake lights on the vehicle whenever: (a) the brake lights are energized, (b) the acceleration of the vehicle is less than the braking threshold, (c) a specified period of time has elapsed since the brake lights were energized, and (d) the operator is not applying the brake of the vehicle.

48. The apparatus as recited in claim 47, further comprising a voltage regulator connected to a power supply and the accelerometer.

49. The apparatus as recited in claim 47, further comprising a switch controlled by the processor, wherein the switch is connected between the brake lights and a ground plane.

50. The apparatus as recited in claim 49, wherein the switch is further connected to a brake pedal of the vehicle.

51. The apparatus as recited in claim 47, wherein the processor does not energize the brake lights when the vehicle is in reverse unless the operator applies the brakes.

52. The apparatus as recited in claim 47, wherein the processor activates an air bag whenever the measured acceleration rate equals or exceeds a collision threshold.

53. The apparatus as recited in claim 47, wherein the processor activates a traction control of the vehicle whenever the acceleration rate equals or exceed the skid threshold.

54. The apparatus as recited in claim 47, wherein the processor:
    logs the acceleration and a status of the brake lights;
    provides the acceleration and the status of the brake lights to one or more vehicle systems, one or more vehicles within a specified range, a remote data processing system, or a combination thereof;
    engages or disengages one or more cylinders in the vehicle based on the acceleration;
    provides the logged data to an onboard diagnostics port; or
    executes one or more start up or initialization procedures.

55. The apparatus as recited in claim 47, wherein:
    the vehicle comprises a car, a truck, a van, a trailer, a motorcycle, a recreational vehicle, a motorized cart, an industrial or construction vehicle, a motorized equipment or a combination thereof; or
    the rate of acceleration is determined by an inertia sensor or a G-force sensor.

* * * * *

UNITED STATES PATENT AND TRADEMARK OFFICE
CERTIFICATE OF CORRECTION

| | |
|---|---|
| PATENT NO. | : 8,441,347 B2 |
| APPLICATION NO. | : 12/860642 |
| DATED | : May 14, 2013 |
| INVENTOR(S) | : Kenneth Adam Marlowe et al. |

Page 1 of 1

It is certified that error appears in the above-identified patent and that said Letters Patent is hereby corrected as shown below:

Title Page:

Item (73), Replace "University of North Texas System" with --University of North Texas--

Signed and Sealed this
Sixth Day of May, 2014

Michelle K. Lee
*Deputy Director of the United States Patent and Trademark Office*